(12) United States Patent
Fu et al.

(10) Patent No.: US 10,895,781 B2
(45) Date of Patent: Jan. 19, 2021

(54) BACKLIGHT MODULE AND DISPLAY MODULE

(71) Applicant: Huizhou China Star Optoelectronics Technology Co., Ltd., Huizhou (CN)

(72) Inventors: Linlin Fu, Huizhou (CN); Dehua Li, HuiZhou (CN)

(73) Assignee: Huizhou China Star Optoelectronics Technology Co., Ltd., Huizhou (CN)

( * ) Notice: Subject to any disclaimer, the term of this patent is extended or adjusted under 35 U.S.C. 154(b) by 0 days.

(21) Appl. No.: 16/607,141

(22) PCT Filed: May 17, 2019

(86) PCT No.: PCT/CN2019/087495
§ 371 (c)(1),
(2) Date: Oct. 22, 2019

(87) PCT Pub. No.: WO2020/220405
PCT Pub. Date: Nov. 5, 2020

(65) Prior Publication Data
US 2020/0341334 A1    Oct. 29, 2020

(30) Foreign Application Priority Data

Apr. 29, 2019 (CN) .......................... 2019 1 0356999

(51) Int. Cl.
*G02F 1/13357* (2006.01)
(52) U.S. Cl.
CPC .. *G02F 1/133604* (2013.01); *G02F 1/133605* (2013.01); *G02F 1/133606* (2013.01); *G02F 1/133608* (2013.01)

(58) Field of Classification Search
CPC ......... G02B 6/0043; G02F 1/133603–133604; F21Y 2105/16
See application file for complete search history.

(56) References Cited

U.S. PATENT DOCUMENTS 9,291,337 B1 * 3/2016 Hulett .................... F21V 21/32
2006/0103776 A1 * 5/2006 Park .................. G02F 1/133603
349/58

(Continued)

FOREIGN PATENT DOCUMENTS

CN        109633979 A  *  4/2019

OTHER PUBLICATIONS

CN-109633979-A English machine translation (Year: 2019).*

*Primary Examiner* — Mariceli Santiago

(57) ABSTRACT

Disclosed is a backlight module and a display module. The backlight module includes a backboard, a light bar, and an atomization layer. The backboard includes a bottom board, a plurality of side boards connected to the bottom board, and a top board connected to the plurality of side boards, and the plurality of side boards are enclosed to define a receiving chamber of the backboard. The light bar is located in the receiving chamber and is fixed at one side of the bottom board facing the top board. The atomization layer is located in the receiving chamber and is fixed at one side of the top board facing the bottom board. The atomization layer is capable of replacing the diffuser plate and the optical film in the current backlight module, thereby reducing the cost of the optical film and the diffuser plate.

14 Claims, 3 Drawing Sheets

(56) References Cited

U.S. PATENT DOCUMENTS

2011/0085110 A1* 4/2011 Lin .................. G02F 1/133606
349/64
2011/0317094 A1* 12/2011 Takase .............. G02F 1/133603
349/61

* cited by examiner

BACKLIGHT MODULE AND DISPLAY MODULE

RELATED APPLICATIONS

This application is a National Phase of PCT Patent Application No. PCT/CN2019/087495 having International filing date of May 17, 2019, which claims the benefit of priority of Chinese Patent Application No. 201910356999.6 filed on Apr. 29, 2019. The contents of the above applications are all incorporated by reference as if fully set forth herein in their entirety.

FIELD AND BACKGROUND OF THE INVENTION

The present invention relates to the display technical field, and in particular, to a backlight module and a display module.

With development of display technology, flat display devices such as liquid crystal displays (LCDs), which possess various advantages, such as high image quality, low power consumption, thin device bodies, and wide range of applications, have been widely employed in various consumer electronics, such as mobile phones, televisions, personal digital assistances, digital cameras, laptops, desktop computers, being in mainstream display devices.

Most of liquid crystal displays on the market are backlight liquid crystal displays, including liquid crystal display panels and backlight modules. The working principle of a liquid crystal display panel is that with liquid crystal molecules are disposed between two parallel glass substrates where a plurality of tiny vertical and horizontal wires are arranged, and application of electricity controls the liquid crystal molecules to change direction in order to refract light emitting from the backlight module to generate images.

Because the liquid crystal display panel itself does not emit light, light must be provided from the backlight module to normally display images. Thus, the backlight module is one of the key components of the liquid crystal displays. The backlight modules can be classified in two types, namely a side-edge backlight module and a direct-type backlight module, according to the incident position of light source. The direct-type backlight module comprises a backlight source, such as a cold cathode fluorescent lamp (CCFL) or a light-emitting diode (LED), which is arranged at the backside of the liquid crystal panel and light is allowed to pass through a diffuser plate for homogenization so as to form a planar light source supplied to the liquid crystal panel.

Currently, use of glass materials instead of traditional metal materials as the backboard of LCD televisions is an innovation in the form of television products. Compared with traditional metals, glass has a smooth surface, capable of silk-screen printing and etching different appearance patterns, which can greatly attract consumers' attention in such a manner that consumers are more inclined to buy the type of televisions. The current glass backboard module on the market is mainly the direct-type structure. FIG. 1 shows the current display module which includes a backlight module 10' and a display panel 20' disposed on the backlight module 10'. The backlight module 10' includes a backboard 100' manufactured with a single-layer tempered glass by silk-screen printing, and a middle frame 200' is attached to the four side of the backboard 100', and then a glass light guide plate 300' and an optical film 400' are disposed in order in the middle frame 200'. The display panel 20' is disposed on the middle frame 200'. FIG. 2 shows another current display module wherein a display panel 20' is attached to the glass light guide plate 300' with a double-sided tape 500' by full lamination. The optical film 400 is disposed between the glass light guide plate 300' and the display panel 20', and the glass light guide plate 300' is attached to the backboard 100' with the double-sided tape 500'. When the two current display modules are applied to a large or high-resolution display screens, the LED current required by the backlight module 10' is large and the generated heat is relatively much. Since the material of glass adopted by the backboard 100' in heat dissipation is not as good as metal, the heat dissipation is a serious problem. In addition, there is no difference between the backboard 100' with material of glass of the backlight module and the backboard 100' with conventional material of metal of the backlight module in the assembly process. That is, each component needs to be separately assembled resulting in low assembly efficiency.

SUMMARY OF THE INVENTION

An object of the present invention is to provide a backlight module, which can reduce cost of the module and improve assembly efficiency and the effect of heat dissipation A further object of the present invention is to provide a display module, which can reduce cost of the module and improve assembly efficiency and the effect of heat dissipation.

In order to achieve the aforementioned objects, the present invention provides a backlight module, comprising: a backboard, a light bar, and an atomization layer. The backboard includes a bottom board, a plurality of side boards connected to the bottom board, and a top board connected to the plurality of side boards, and the plurality of side boards are enclosed to define a receiving chamber of the backboard. The light bar is located in the receiving chamber and is fixed at one side of the bottom board facing the top board. The atomization layer is located in the receiving chamber and is fixed at one side of the top board facing the bottom board.

The bottom board, the plurality of side boards and the top board are integrally formed.

A plurality of light diffusing particles of different particle sizes are provided in the atomization layer.

The backlight module further comprises a reflective layer provided between the light bar and the bottom board.

Material of the bottom board, the plurality of side boards, and the top board are glass.

All edges of the bottom board, the plurality of side boards, and the top board are curved, and all middle portions of the bottom board, the plurality of side boards, and the top board are flat.

A number of the plurality of side boards is three.

The light bar is fixed on the bottom board by attaching.

A side of the bottom board facing the top board is provided with a groove, and the light bar is located in the groove.

The prevent invention further provides a display module which includes the backlight module mentioned above and a display panel disposed on the backlight module.

The present invention has the beneficial effects that the backlight module of the present invention includes a backboard, a light bar, and an atomization layer. The backboard includes a bottom board, a plurality of side boards connected to the bottom board, and a top board connected to the plurality of side boards, and the plurality of side boards are enclosed to define a receiving chamber of the backboard. The light bar is located in the receiving chamber and is fixed at one side of the bottom board facing the top board. The atomization layer is located in the receiving chamber and is fixed at one side of the top board facing the bottom board. The atomization layer is capable of replacing the diffuser plate and the optical film in the current backlight module, thereby reducing the cost of the optical film and the diffuser plate. Moreover, the assembly process is simple, the degree of integration is high, and the assembly efficiency of the backlight module is improved. In addition, the heat generated by the light bar can be directly transmitted to the receiving chamber to be released, thereby improving the effect of heat dissipation of the backlight module. The display module of the present invention has a high degree of integration, low cost and good heat dissipation effect.

BRIEF DESCRIPTION OF THE SEVERAL VIEWS OF THE DRAWINGS

For better understanding of the features and technical contents of the present invention, reference will be made to the following detailed description of the present invention and the attached drawings. However, the drawings are provided for the purposes of reference and illustration and are not intended to impose limitations to the present invention. In the drawings.

DETAILED DESCRIPTION OF SPECIFIC EMBODIMENTS OF THE INVENTION

In order to further elaborate the technical means and effect adopted by the present invention, a detailed description is given to a preferred embodiment of the present invention and the attached drawings.

Figure 1:
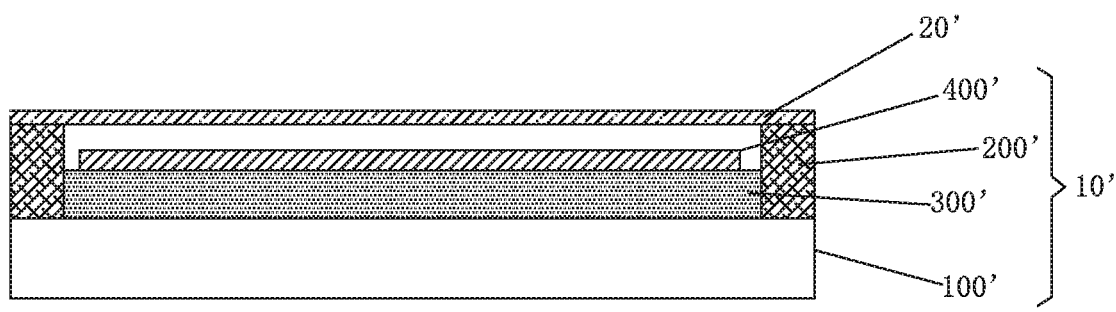
FIG. 1 is a schematic view showing the structure of a conventional display module.
Figure 2:
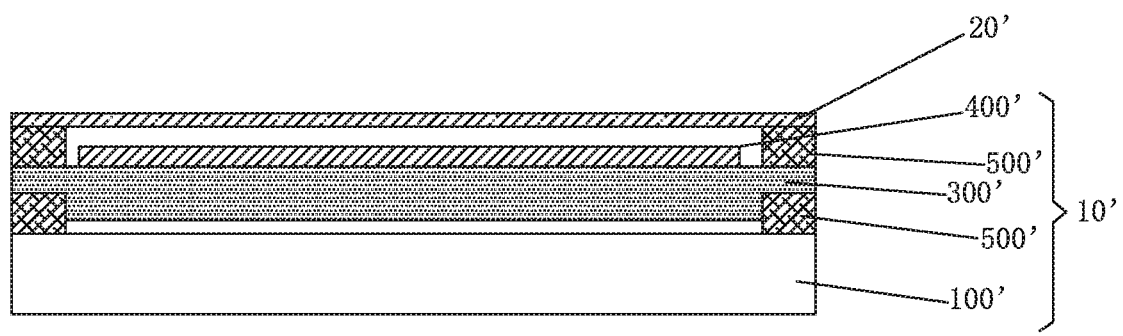
FIG. 2 is a schematic view showing the structure of another conventional display module.
Figure 3:
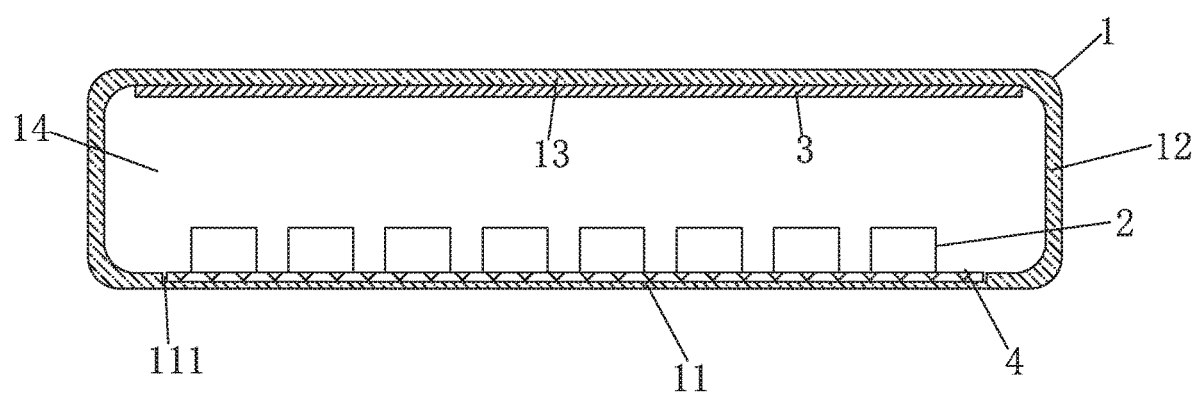
FIG. 3 is a schematic view showing the structure of a backlight module of the present invention.

Refer to FIG. 3, the present invention provides a backlight module, comprising: a backboard 1, a light bar 2, and an atomization layer 3.

The backboard 1 includes a bottom board 11, a plurality of side boards 12 connected to the bottom board 11, and a top board 13 connected to the plurality of side boards 12, and the plurality of side boards 12 are enclosed to define a receiving chamber 14 of the backboard 1.

The light bar 2 is located in the receiving chamber 14 and is fixed at one side of the bottom board 11 facing the top board 13.

The atomization layer 3 is located in the receiving chamber 14 and is fixed at one side of the top board 13 facing the bottom board 11.

It should be noted that, the light bar 2 can be directly disposed in the receiving chamber 14 and be fixed at one side of the bottom board 11 facing the top board 13 and the atomization layer 3 can be directly disposed in the receiving chamber 14 and be fixed at one side of the top board 13 facing the bottom board 11 to reduce the effect of water and oxygen on the atomization layer 3 and prevents scratching of the atomization layer 3 in the display module and the lower polarizer in the display panel by the structure of the backboard 1 having the bottom board 11, a plurality of side boards 12 connected to the bottom board 11, and a top board 13 connected to the plurality of side boards 12, and the plurality of side boards 12 enclosed to define a receiving chamber 14. The atomization layer 3 is capable of replacing the diffuser plate and the optical film in the current backlight module, thereby reducing the cost of the optical film and the diffuser plate. Moreover, the assembly process is simple, the degree of integration is high, and the assembly efficiency of the backlight module is improved. In addition, compared to the current solid backboard, the weight of a glass backboard can be reduced by the backboard with a receiving chamber 14 of the present invention, and the heat generated by the light bar 2 can be directly transmitted to the receiving chamber 14 to be released, thereby improving the effect of heat dissipation of the backlight module.

Specifically, the bottom board 11, the plurality of side boards 12 and the top board 13 are integrally formed.

Specifically, a plurality of light diffusing particles of different particle sizes are provided in the atomization layer 3.

Specifically, the backlight board further comprises a reflective layer 4 provided between the light bar 2 and the bottom board 11. The reflective layer 4 can reflect the light emitted by the light bar 2 toward the bottom board 11, thereby improving the extraction efficiency of the backlight module.

Further, the reflective layer 4 is formed on the bottom board 11, by coating.

Specifically, material of the bottom board 11, the plurality of side boards 12, and the top board 13 are glass.

Further, material of the bottom board 11, the plurality of side boards 12, and the top board 13 are 2.5d curved glass. That is, all edges of the bottom board 11, the plurality of side boards 12, and the top board 13 are curved, and all middle portions of the bottom board 11, the plurality of side boards 12, and the top board 13 are flat. Then, the curved edges of the bottom board 11 are connected to the curved edges of the side boards 12 and the curved edges of the top board 13 are connected to the curved edges of the side boards 12 so that the edges of the bottom board 11, the plurality of side boards 12, and the top board 13 can be prevented from scratching and the strength of the bottom board 11, the plurality of side boards 12, and the top board 13 can be improved.

Further, a number of the plurality of side boards 12 is three. The three side boards 12 are sequentially connected so that the receiving chamber 14 has an opening to reserve a space for the assembly of the light bar 2 and the like. After the backlight module is assembled, the opening of the receiving chamber 14 can be sealed by the light shielding tape.

Further, material the bottom board 11, the plurality of side boards 12 and the top board 13 are tempered glass to further increase the reliability of the back board 1.

Specifically, the light bar 2 is fixed on the bottom board 11 by attaching.

Specifically, a side of the bottom board 11 facing the top board 13 is provided with a groove 111, and the light bar 2 is located in the groove 111.

Specifically, the light bar 2 includes a plurality of light emitting diodes arranged in an array and lenses respectively covering the plurality of light emitting diodes. Alternatively, the light bar 2 includes a plurality of mini light emitting diodes arranged in an array.

Figure 4:
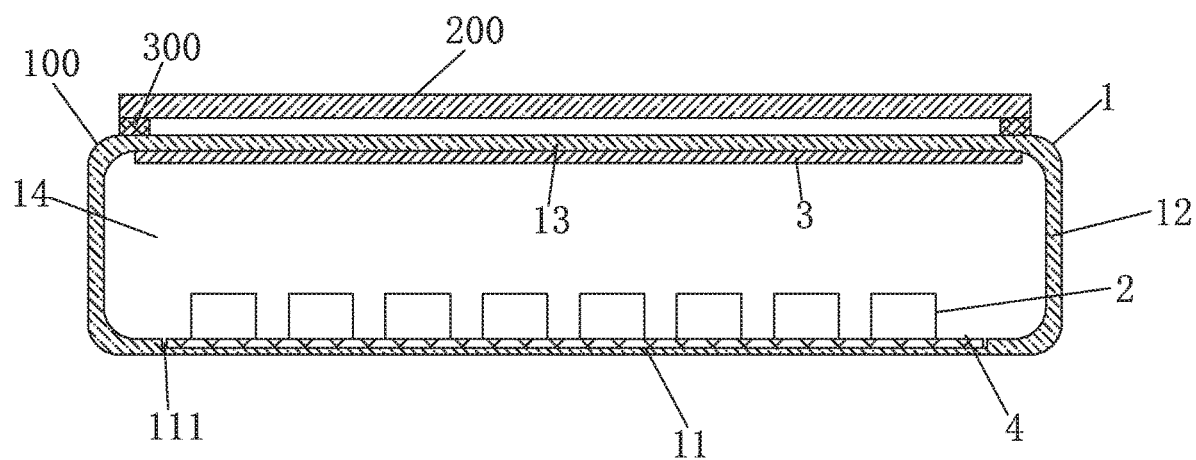
FIG. 4 is a schematic view showing the structure of a display module of the present invention.

Please refer to FIG. 4, the present invention further provides a display module which includes the backlight module 100 mentioned above and a display panel 200 disposed on the backlight module 100.

Specifically, the display panel 200 is attached to the backlight module 100 by the double-sided tape 300. The double-sided tape 300 can be a foam rubber. The double-sided tape 300 is attached to a frame region (not shown) of the display panel 200 to avoid affecting the display of the display panel 200.

As mentioned above, the backlight module of the present invention comprises the backboard, the light bar, and the atomization layer. The backboard includes the bottom board, the plurality of side boards connected to the bottom board, and the top board connected to the plurality of side boards, and the plurality of side boards are enclosed to define the receiving chamber of the backboard. The light bar is located in the receiving chamber and is fixed at one side of the bottom board facing the top board. The atomization layer is located in the receiving chamber and is fixed at one side of the top board facing the bottom board. The atomization layer is capable of replacing the diffuser plate and the optical film in the current backlight module, thereby reducing the cost of the optical film and the diffuser plate. Moreover, the assembly process is simple, the degree of integration is high, and the assembly efficiency of the backlight module is improved. In addition, the heat generated by the light bar can be directly transmitted to the receiving chamber to be released, thereby improving the effect of heat dissipation of the backlight module. The display module of the present invention has a high degree of integration, low cost and good heat dissipation effect.

Based on the description given above, those having ordinary skills of the art may easily contemplate various changes and modifications of the technical solution and technical ideas of the present invention and all these changes and modifications are considered within the protection scope of right for the present invention as defined in the appended claims.

What is claimed is:

1. A backlight module, comprising: a backboard, a light bar, and an atomization layer;
   wherein the backboard includes a bottom board, a plurality of side boards connected to the bottom board, and a top board connected to the plurality of side boards, the plurality of side boards are enclosed to define a receiving chamber of the backboard;
   wherein the light bar is located in the receiving chamber and is fixed at one side of the bottom board facing the top board; and
   wherein the atomization layer is located in the receiving chamber and is fixed at one side of the top board facing the bottom board, material of the bottom board, the plurality of side boards and the top board are glass, all edges of the bottom board, the plurality of side boards, and the top board are curved, and all middle portions of the bottom board, the plurality of side boards, and the top board are flat.

2. The backlight module of claim 1, wherein the bottom board, the plurality of side boards and the top board are integrally formed.

3. The backlight module of claim 1, wherein a plurality of light diffusing particles of different particle sizes are provided in the atomization layer.

4. The backlight module of claim 1, further comprising a reflective layer provided between the light bar and the bottom board.

5. The backlight module of claim 1, wherein a number of the plurality of side boards is three.

6. The backlight module of claim 1, wherein the light bar is fixed on the bottom board by attaching.

7. The backlight module of claim 1, wherein a side of the bottom board facing the top board is provided with a groove, and the light bar is located in the groove.

8. A display module, comprising: a backlight module and a display panel disposed on the backlight module;
   wherein the backlight module includes: a backboard, a light bar, and an atomization layer,
   wherein the backboard includes a bottom board, a plurality of side boards connected to the bottom board, and a top board connected to the plurality of side boards, and the plurality of side boards are enclosed to define a receiving chamber of the backboard;
   wherein the light bar is located in the receiving chamber and is fixed at one side of the bottom board facing the top board; and
   wherein the atomization layer is located in the receiving chamber and is fixed at one side of the top board facing the bottom board, material of the bottom board, the plurality of side boards and the top board are glass, all edges of the bottom board, the plurality of side boards, and the top board are curved, and all middle portions of the bottom board, the plurality of side boards, and the top board are flat.

9. The display module of claim 8, wherein the bottom board, the plurality of side boards and the top board are integrally formed.

10. The display module of claim 8, wherein a plurality of light diffusing particles of different particle sizes are provided in the atomization layer.

11. The display module of claim 8, wherein the backlight module further comprises a reflective layer provided between the light bar and the bottom board.

12. The display module of claim 8, wherein a number of the plurality of side boards is three.

13. The display module of claim 8, wherein the light bar is fixed on the bottom board by attaching.

14. The display module of claim 8, wherein a side of the bottom board facing the top board is provided with a groove, and the light bar is located in the groove.

* * * * *